US012748177B2

(12) United States Patent
Filippi et al.

(10) Patent No.: US 12,748,177 B2
(45) Date of Patent: Sep. 29, 2026

(54) TERRESTRIAL TRANSMITTER COEXISTENCE WITH SATELLITE OPERATIONS

(71) Applicant: NXP B.V., Eindhoven (NL)

(72) Inventors: Alessio Filippi, Eindhoven (NL); Vincent Pierre Martinez, Venerque (FR); Marnix Claudius Vlot, Eindhoven (NL)

(73) Assignee: NXP B.V., Eindhoven (NL)

( * ) Notice: Subject to any disclaimer, the term of this patent is extended or adjusted under 35 U.S.C. 154(b) by 363 days.

(21) Appl. No.: 18/336,069

(22) Filed: Jun. 16, 2023

(65) Prior Publication Data

US 2024/0168173 A1 May 23, 2024

(30) Foreign Application Priority Data

Nov. 23, 2022 (EP) .................................... 22306725

(51) Int. Cl.
*G01S 7/02* (2006.01)
*G01S 19/42* (2010.01)
*G01S 19/46* (2010.01)

(52) U.S. Cl.
CPC .............. *G01S 7/023* (2013.01); *G01S 19/42* (2013.01); *G01S 19/46* (2013.01)

(58) Field of Classification Search
CPC ....... G01S 19/428; G01S 19/46; G01S 13/931
See application file for complete search history.

(56) References Cited

U.S. PATENT DOCUMENTS

2018/0092103 A1* 3/2018 Gurney ................. H04W 16/14
2020/0219401 A1* 7/2020 Ren ....................... H04W 4/021

OTHER PUBLICATIONS

E. Eichen, “Performance of Real-Time Geospatial Spectrum Sharing (RGSS) between 5G Communication Networks and Earth Exploration Satellite Services,” 2021, pp. 73-79, doi: 10.1109/DySPAN53946.20 (Year: 2021).*
ECC, “Compatibility of automotive collision warning short range radar operating at 24 GHz wit FS, EESS, and radio astronomy.” Electronic Communications Committee (ECC), May 2003. https://docdb.cept.org/download/271 (Year: 2003).*
Mun, K., “CBRS: New shared spectrum enables flexible indoor and outdoor mobile solutions and new business models.” Mobile Experts LLC, 2017. https://ongoalliance.org/wp-content/uploads/2018/05/Mobile-Experts-CBRS-Overview-FINAL.pdf (Year: 2017).*
M. Höyhtyä et al., “Database-Assisted Spectrum Sharing in Satellite Communications: A Survey,” in IEEE Access, vol. 5, pp. 25322-25341, 2017, doi: 10.1109/ACCESS.2017.2771300 (Year: 2017).*
(Continued)

*Primary Examiner* — Vladimir Magloire
*Assistant Examiner* — Anna K. Gosling

(57) ABSTRACT

A system includes a transmitter configured to emit a signal. The system includes a control system, configured to determine a geographical mitigation region of a satellite, determine the transmitter is located within the geographical mitigation region, and modify an operation of the transmitter to mitigate interference with an observation sensing activity of the satellite.

12 Claims, 9 Drawing Sheets

(56) References Cited

OTHER PUBLICATIONS

E. Eichen, "Real-Time Geographical Spectrum Sharing by 5G Networks and Earth Exploration Satellite Services," 2019 IEEE International Symposium on Dynamic Spectrum Access Networks (DySPAN), Newark, NJ, USA, 2019, pp. 1-2, doi: 10.1109/DySPAN.2019.8935715 (Year: 2019).*

Blattenberger, K. (2010). Electronic warfare and radar systems engineering handbook: frequency/phase effects of antennas. RF CafÃ ©. https://www.rfcafe.com/references/electrical/ew-radar-handbook/frequency-phase-effects-antennas.htm. (Year: 2010).*

Boerner, Wolfgang-Martin et al; "User Collision in Sharing of Electromagnetic Spectrum: Frequency Allocation, RF Interface Reduction & RF Security Threat Mitigation in Radio Propagation and Passive & Active Remote Sensing"; retrieved from the Internet https://airsar.jpl.nasa.gov/documents/workshop2002/papers/T9.pdf; Mar. 2, 2022; 54 pages, (2002).

CEPT—Electronic Communications Committee SE24; "Document W171#16-06_Rev1"; retrieved from the Internet https://www.cept.org/Documents/se-24/63378/wi7116-06r1_eess-updated-studies, Mar. 4, 2021; 2 pages.

CEPT—Electronic Communications Committee; "Report UWB radiodetermination applications in the frequency range 116-260 GHz—Draft"; retrieved from the Internet https://www.cept.org/Documents/se-24/65405/wi7119-01_draft-ecc-report-on-wi71 Mar. 2, 2022; 249 pages.

International Telecommunication Union, ITU-R; "Report ITU-R RS.2165—Identification of degradation due to interference and characterization of possible interference mitigation techniques for passive sensors operating in the Earth exploration-satellite service (passive)"; retrieved from the Internet https://www.itu.int/pub/R-REP-RS.2165-2009, Mar. 2, 2022; 44 pages (Sep. 2009).

International Telecommunications Union; "Typical technical and operational characteristics of Earth exploration satellite services (passive) systems using allocation between 1.4 and 275 GHz, Recommendation ITU-R RS.1861"; 46 pages, Jan. 2010.

ITU—Radiocommunication Bureau; Handbook—"Earth Exploration—Satellite Service"; retrieved from the Internet https://library.wmo.int/doc_num.php?explnum_id=2301 Mar. 2, 2022; 96 pages, (2011).

ITU News; "Earth observation for weather prediction—solving the interference problem"; retrieved from the Internet https://news.itu.int/earth-observation-weather-prediction-solving-interference-problem Mar. 2, 2022; 10 pages, (Feb. 18, 2019).

ITU; "Reducing harmful interference to satellites near Earth, the Moon and beyond"; 3 pages (Sep. 21, 2020), retrieved from the internet https://www.itu.int/en/myitu/News/2020/09/21/12/10/Reducing-harmful-interference-to-satellites.

Muhammad, C B et al; "Interference Mitigation using Adaptive Beamforming with RLS Algorithm for Coexistence between 5G and Fixed Satellite Services in C-Band"; J. of Physics: Conference Series 1577; 10 pages, (2020).

Zuzek, John; Nasa; "Earth Exploration-Satellite Service (EES)—Passive Spaceborne Remote Sensing"; ITU/WMO Seminar on Spectrum & Meteorology, Geneva, Switzerland; 25 pages, Sep. 16-17, 2009.

CEPT ECC Report 351, "UWB radiodetermination applications within the frequency range 116 GHz to 148.5 GHz for vehicular use", downloaded from https://docdb.cept.org/download/4273 on Mar. 29, 2023, approved Feb. 3, 2023, 129 pages.

* cited by examiner

TERRESTRIAL TRANSMITTER COEXISTENCE WITH SATELLITE OPERATIONS

CROSS-REFERENCE TO RELATED APPLICATIONS

This application claims the priority under 35 U.S.C. § 119 of European Patent application no. 22306725.7, filed on 23 Nov. 2022, the contents of which are incorporated by reference herein.

TECHNICAL FIELD

Aspects of various embodiments of the present disclosure are directed to an apparatus and method for mitigating interference that may be caused by transmitters of electromagnetic radiation, such as those found in vehicular radar systems or other infrastructure radar systems, operating or transmitting signals in the same frequency band as passive observation satellites and, more particularly, to transmitters configured to modulate signal emissions in a particular frequency band when the transmitter is located within an observation region of a satellite monitoring signals in the same band.

BACKGROUND

Various types of transmitter systems may be configured to transmit electromagnetic signals. For example, some such systems may include radar systems that transmit electromagnetic signals and receives back reflections of the transmitted signal. The time delay between the transmitted and received signals can be determined and used to calculate the distance and/or the speed of objects causing the reflections.

In automotive applications, such radar systems can be used to determine the distance and/or the speed of oncoming vehicles and other obstacles. As such, these transmitter systems can enable the implementation of advanced driver-assistance system (ADAS) functions, such as automatic cruise control, blind-spot detection, assisted parking, and/or automatic safety breaking, that are likely to enable increasingly safe driving and, eventually, fully autonomous driving platforms. As the number of deployed vehicle radar systems increases, the systems may be configured to operate in a variety of frequency bands.

Other electromagnetic transmitters may be implemented within other types of transmitters, such as mobile devices, cellphones, cellular infrastructure transmitters, WIFI-stations and other types of transmitters, not just other radar systems. Some types of transmitters may be mobile and change their respective locations over time. Other types of transmitters may be in a fixed location and so have a location that is well defined.

Some proposed frequency bands used by transmitters, such as those utilized by fixed and/or mobile radar systems may overlap with or be adjacent to those utilized by other systems. For example, some of the available frequency bands between 120 gigahertz (GHz) and 160 GHz have been proposed for future use by various radar applications. These frequency bands can include or be directly adjacent to frequency bands that are observed by various passive satellite systems, such as those used by the Earth Exploration Satellite Services (EESS), to passively monitor signals emanating from earth for scientific and commercial research activities.

If a number of such transmitter systems are operating (i.e., emitting electromagnetic signals) in a particular geographical region that is also being observed by such a satellite and those systems are transmitting signals in the same frequency band (or in adjacent bands) that is being observed or otherwise detected by the satellite, the signal transmissions could interfere with the readings captured by that satellite.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
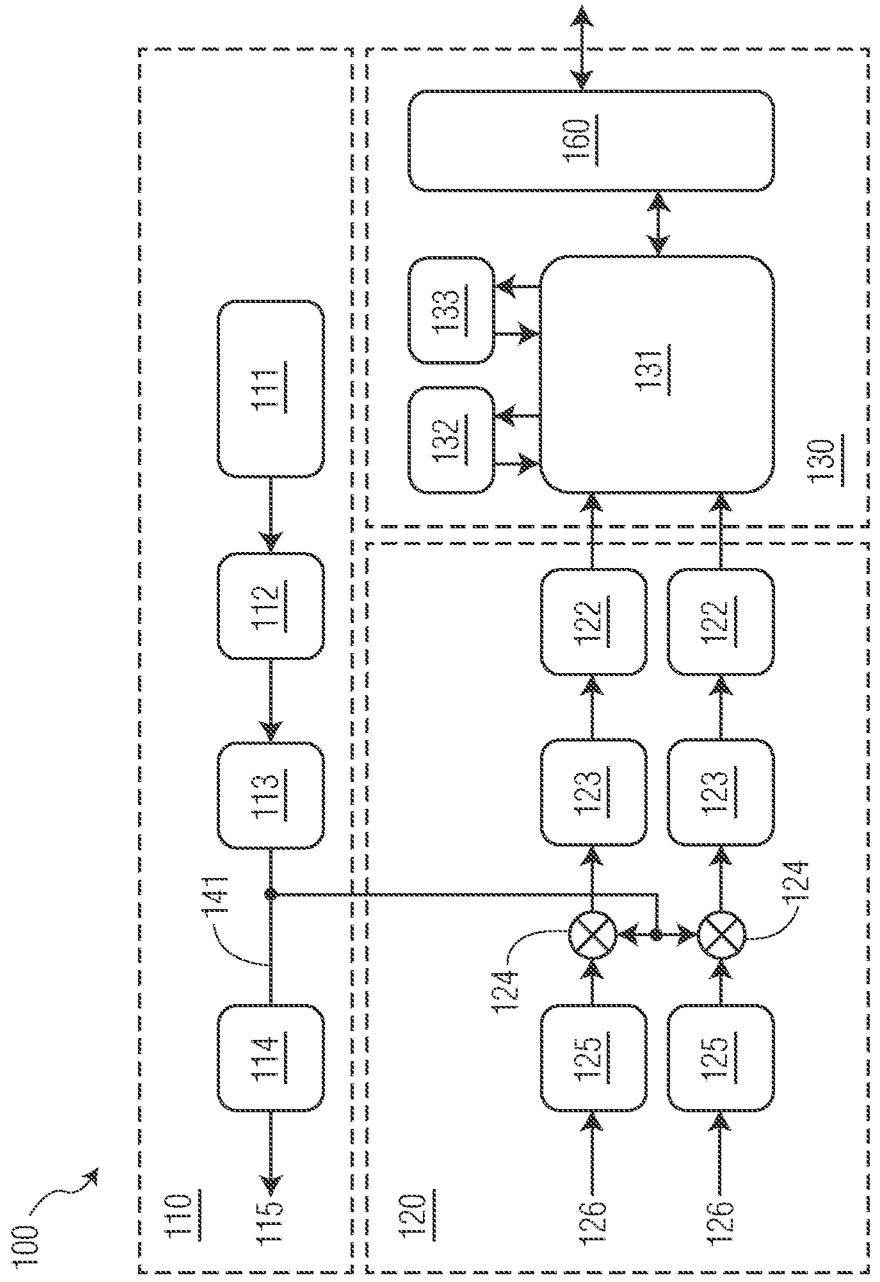
FIG. 1 is a block diagram depicting the functional components of a vehicle radar system.

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

Many electronic devices include signal transmitters configured to emit electromagnetic radiation. For example, wireless communication systems, various sensor devices, vehicle radar systems, mobile devices, and the like may each include circuitry and components configured to emit or transmit electromagnetic signals in a variety of frequencies. The signals emitted by these types of devices and systems could interfere with satellite-based sensors if the transmitters transmit signals in the same frequencies as those observed by the satellites and in a geographical region that is currently being observed by the satellite. This interference could result in inaccurate satellite sensor readings. Although the present disclosure describes various example embodiments of a transmitter configured to emit radar signals, it should be understood that the present disclosure is equally applicable to other types of transmitters that may not emit radar signals and may instead emit other types of electromagnetic signals.

Accordingly, in certain implementations, aspects of the present disclosure can be beneficial when used in the context of vehicle radar systems transmitting signals in frequency bands that overlap with or are adjacent to those measured by various satellite-based earth observation systems. In some embodiments, the present system and method are configured to enable a determination that a vehicle radar system is operating within a satellite's geographical mitigation region, which includes a geographical area being observed by a satellite, and emitting signals in the same frequency band as the signals being measured by that satellite. Based upon that determination, the operation of the vehicle radar system can be modified, such as by temporarily inhibiting the emissions of radar signals or using different parameterization thereof (e.g., by reducing the transmit power, reducing the duty cycle, or changing the antenna beam pattern), to mitigate interference with the satellite's measurements.

In the following description various details are set forth to describe specific examples or embodiments presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Many different types of systems are configured to emit or otherwise transmit electromagnetic signals. To illustrate one such type of system, FIG. 1 is a block diagram depicting the functional components of a radar system comprising a vehicle radar system 100. Vehicle radar system 100 includes three main sections: transmit section 110, a receive section 120 and a control and processing section 130. In the example depicted in FIG. 1, vehicle radar system 100 is configured to modulate signals using a frequency modulated continuous wave (FMCW), though other radar system configurations may be used instead, such as digital modulated radar (DMR) or orthogonal frequency division multiplexing (OFDM) radar systems.

In this example radar system 100, the transmit section 110 comprises a high-frequency chirp generator 111, which produces frequency modulated continuous wave (FMCW) chirp signals. The chirp signals are supplied to a phase locked loop (PLL) 112, and then may be adjusted in a frequency modifier 113 to provide a signal 141. The signal 141 is amplified by a power amplifier 114, and fed, via an antenna coupling 115 (which may be on-chip or off-chip), to be transmitted by a transmit aerial or antenna (not shown) as a radar signal.

In the presence of a reflective object, the transmitted signal may be reflected from that object and a reflected radar signal may be received by one or more receive aerials or antenna of the vehicle radar system 100 (not shown), and input via one or more antenna input connectors 126, to the receive section 120.

In FIG. 1 two receivers are shown, although it will be appreciated that the system may comprise a different number of receivers, such as one or three. Each received signal 126 is amplified by a low noise amplifier 125 and down converted by being mixed with a copy of the output signal 141 in mixer 124. Each down-converted signal is filtered by filter 123, digitized, and transmitted to digital signal processor 131 by an analog-to-digital converter (ADC) 122.

The digital signal processor 131 forms part of the control and processing section 130. The control and processing section 130 also includes a clock generator 132 for providing a clock function, together with a microprocessor and timing reference device 133 for providing appropriate timing signals. The output from the radar system may be communicated with other electronics within the automobile over a controller area network (CAN) bus or Ethernet interface 160.

Accordingly, in a vehicle radar system, a signal, modulated according to a specific waveform principle, is transmitted at a predetermined carrier frequency. The reflected signals are processed by the digital part of the system. In these processing steps one or more of the distances to an object, the relative radial velocity, that is to say, the velocity at which the object is approaching the vehicle, and the angle between the object and the vehicle can be calculated. Data captured by the vehicle radar system 100 can then be provided to a more general vehicle control system, which can take appropriate action based upon the data, such as generating a driver alert or activating the vehicle's braking system. Within a particular vehicle, a number of different radar systems may be implemented to provide a vehicle control system with data regarding objects in the vicinity of the vehicle that reflect the radar system's transmitted signals. Such systems may be utilized to implement one or more of adaptive cruise control (ACC), autonomous emergency braking (AEB), blind spot detection (BSD), cascaded imaging radar (IMR), front/rear cross-traffic-functions (FCTA/RCTA), lane change assistance (LCA), park assist (PA), reverse-autonomous emergency braking (R-AEB), and radar 360° perception, for example.

The number of operational vehicle radar systems and other types of signal transmission systems have increased dramatically in recent years and will continue increasing. This is due both to the number of vehicles that incorporate radar systems as well as the number of different radar systems that may be implemented within each vehicle. Additionally, as smart infrastructure systems continue to be developed, there is significant growth in the number of wireless communication systems, mobile and fixed sensor systems, and the like, that are operational, each of which may include one or more signal transmitters. As the number of these systems grows, it may be necessary expand the number of available frequencies in which they can operate. This expansion may lead to interference with other pre-existing systems.

For example, many vehicle radar systems operate in the 76 GHz-81 GHz band (i.e., the radar systems transmit or emit signals having frequencies that fall within that band). However, due to the increasing numbers of radar systems using that band, there is a risk that the band could become saturated, leading to interference and performance degradation of those radar systems.

As an alternative, new candidate frequency bands can be utilized by such radar systems in the future, where such bands are not as heavily congested as those currently in use. Expanding these radar applications into new frequency bands can present challenges, however, as the new frequency bands should both satisfy the high frequency bandwidth requirements of the new radar systems, while allowing the radar systems to operate without creating unacceptable interference to legacy services either in the same frequency band or in adjacent frequency bands. Currently, there is some consideration of available bands in the frequency range between 120 GHz and 160 GHz for potential use in vehicle radar applications. These bands are used by various other existing services.

Figure 2:
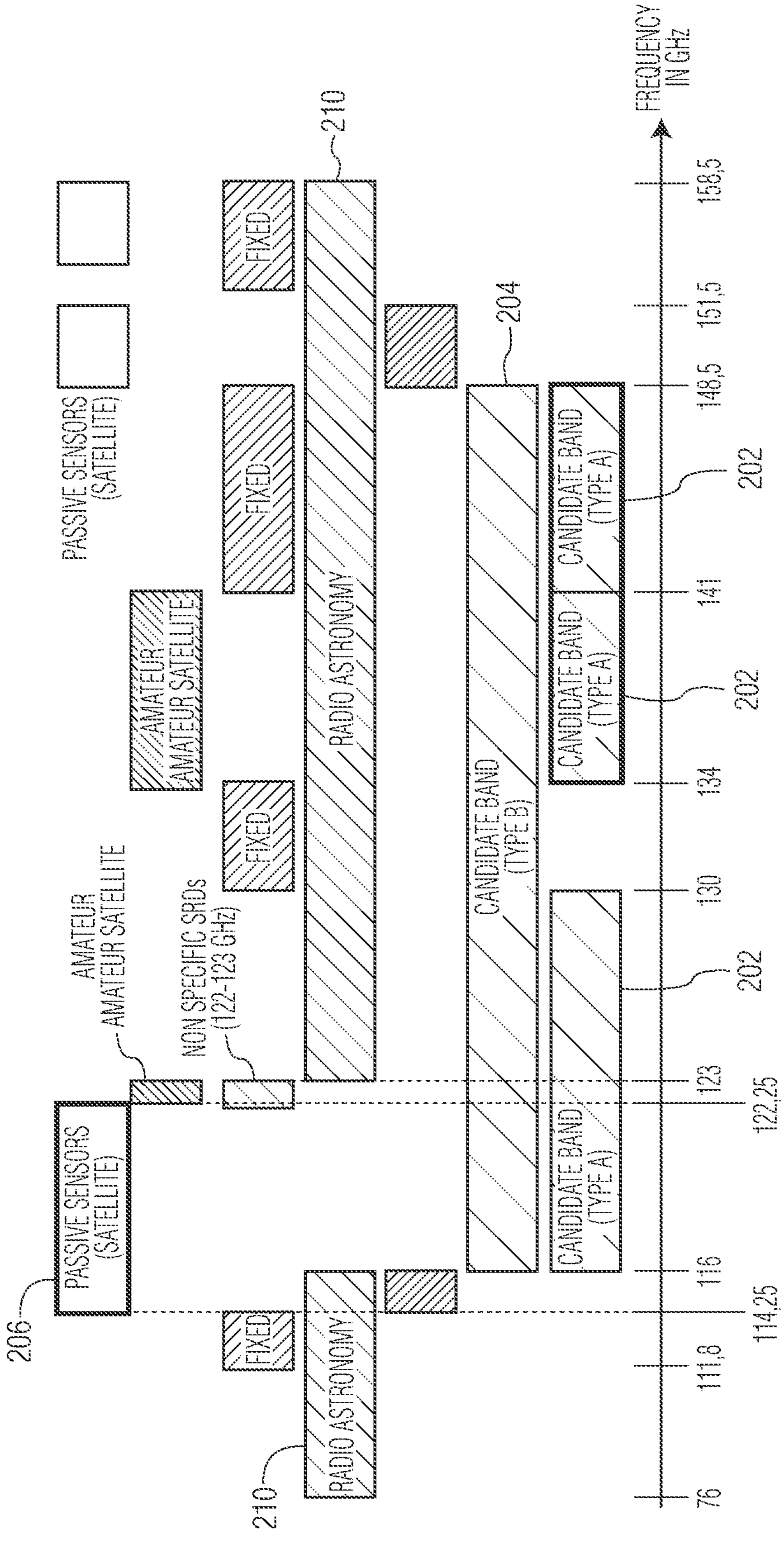
FIG. 2 is a chart depicting candidate bands for vehicle radar applications, alongside other frequency bands used by other systems in nearby and adjacent frequency ranges.

To illustrate, FIG. 2 is a chart depicting utilization of frequency bands ranging from 76 GHz to 158.5 GHz including proposed frequency bands for future radar applications such as vehicle and fixed-location radar systems. As depicted, the two proposed bands 202 and 204 for these radar applications, which occur between about 134 GHz and 148.5 GHz, overlap with those used by various passive sensor satellite operations (indicated by band 206), which may include passive earth observation activities or other astronomy activities (indicated by band 210). For example, Earth observation satellites, such as those utilized by the Earth exploration satellite service (EESS), may be utilized for weather monitoring purposes and may also be known as meteorological satellites (MetSats). Such satellites typically incorporate passive sensor arrays that are configured to measure electromagnetic energy emitted, absorbed, or scattered by the Earth's surface or atmosphere within those particular frequency ranges.

Because there is overlap between the proposed radar bands 202 and 204 and band 206, there may be some risk that the signals emitted by radar systems operating in bands 202 and 204 could be detected by passive observation satellites operating within band 206, thereby interfering with or rendering inaccurate the scientific measurements being collected by those satellites. This may be particularly problematic if an observation satellite is configured to observe a particular region of earth while measuring signals occurring within band 206 and, at the same time, a number of radar systems are operating in that same geographical region by transmitting radar signals in the same frequency band. The proposed bands 202 and 204 similarly overlap with the large frequency band 210 utilized for radio astronomy application and may present potential interference to those types of satellite observation activities as well.

For example, the satellite observation of signals received from the Earth's surface in the frequency band 114.25 GHz-122.25 GHz may be utilized for atmospheric temperature profiling (e.g., O2 absorption lines) as part of a weather monitoring and prediction service. Table 1 summarizes various parameters of a typical passive observation sensor utilized within a satellite monitoring system in this frequency band.

TABLE 1

| | Sensor M1 |
|---|---|
| Sensor type | Limb sounder |
| **Orbit parameters** | |
| Altitude | 705 km |
| Inclination | 98.2° |
| Eccentricity | 0.0015 |
| Repeat period | 16 days |
| **Sensor antenna parameters** | |
| Number of beams | 2 |
| Reflector diameter | 1.6 m × 0.8 m |
| Maximum beam gain | 60 dBi |
| Polarization | 2 orthogonal |
| −3 dB beamwidth | 0.19° × 0.245° |
| Instantaneous field of view | 6.5 km × 13 km |
| Main beam efficiency | N/A |
| Off-nadir pointing angle | Limb |
| Beam dynamics | N/A |
| Incidence angle at Earth | N/A |
| −3 dB beam dimensions | 3 km |
| Swath width | N/A |
| Sensor antenna beam pattern | N/A |
| Cold calibration ant. gain | N/A |
| Cold calibration angle (degrees re. satellite track) | N/A |
| Cold calibration angle (degrees re. nadir direction) | N/A |
| **Sensor receiver parameters** | |
| Sensor integration time | 0.166 s |
| Channel bandwidth | N/A |
| **Measurement spatial resolution** | |
| Horizontal resolution | 13 km |
| Vertical resolution | 6.5 km |

Additionally, the 148.5 GHz-151.5 GHz passive sensor band is used for the measurement of nitrous oxide ($N_2O$), Earth's surface temperature, and cloud parameters. The frequency band is also used as a reference window for temperature soundings. Table 2 summarizes various parameters of a typical passive observation sensor utilized within a satellite monitoring system in this frequency band.

TABLE 2

| | Sensor N1 |
|---|---|
| Sensor type | Cross-track nadir scan |
| **Orbit parameters** | |
| Altitude | 705 km |
| Inclination | 98.2° |
| Eccentricity | 0.0015 |
| Repeat period | 16 days |
| **Sensor antenna parameters** | |
| Number of beams | 1 |
| Reflector diameter | 0.219 m |
| Maximum beam gain | 45 dB |
| Polarization | Linear |
| −3 dB beamwidth | 1.1° |
| Main beam efficiency | >95% |
| Off-nadir pointing angle | ±48.95° |
| Beam dynamics | Scan period of 8/3 s |
| Incidence angle at Earth | 56.9° |
| −3 dB beam dimensions | 13.5 km |
| Swath width | 1 650 km |
| Sensor antenna beam pattern | N/A |
| Cold calibration ant. gain | 45 dB |
| Cold calibration angle (degrees re. satellite track) | 90° |
| Cold calibration angle (degrees re. nadir direction) | 65-81° |
| **Sensor receiver parameters** | |
| Sensor integration time | 18 ms |
| Channel bandwidth | 4 000 MHz @ 150 GHz |
| **Measurement spatial resolution** | |
| Horizontal resolution | 13.5 km |
| Vertical resolution | 13.5 km |

To mitigate the potential interference of radar systems, such as vehicle or fixed-location radar systems, emitting signals in the same frequency bands as those being measured by observational satellite systems, the present disclosure provides a system and method to enable a radar system to modulate its operation to reduce the emission of signals that may cause interference in an observation satellite monitoring signals in the same geographical region and at the same frequency or adjacent frequencies. Specifically, knowledge about a particular satellite's position in time can be used to determine the satellite's geographical observation region—the region of Earth that falls within the field of vision (FOV) of the satellite's passive sensor array. If a radar system determines that it is located within or proximate to that geographical observation region, the radar system modifies its operation to temporarily inhibit or modulate the emission of signals in frequency ranges that may interfere with the satellite's observational activities. Alternatively, the transmitter system may be configured to define a safety margin or protected area about the satellite's geographical observation region, referred to in this disclosure as the geographical mitigation area, and to modulate its emissions to minimize interference when the transmitter is located within that expanded area.

Accordingly, in an embodiment, a transmitter may be configured to disable or inhibit signal transmissions in a frequency band (or otherwise modify the parameters of those transmissions) when a particular satellite (e.g., an EESS satellite) is observing in the same frequency band or in an adjacent frequency band and in the region of earth (i.e., the geographical mitigation region) in which the transmitter is located.

Figure 3:
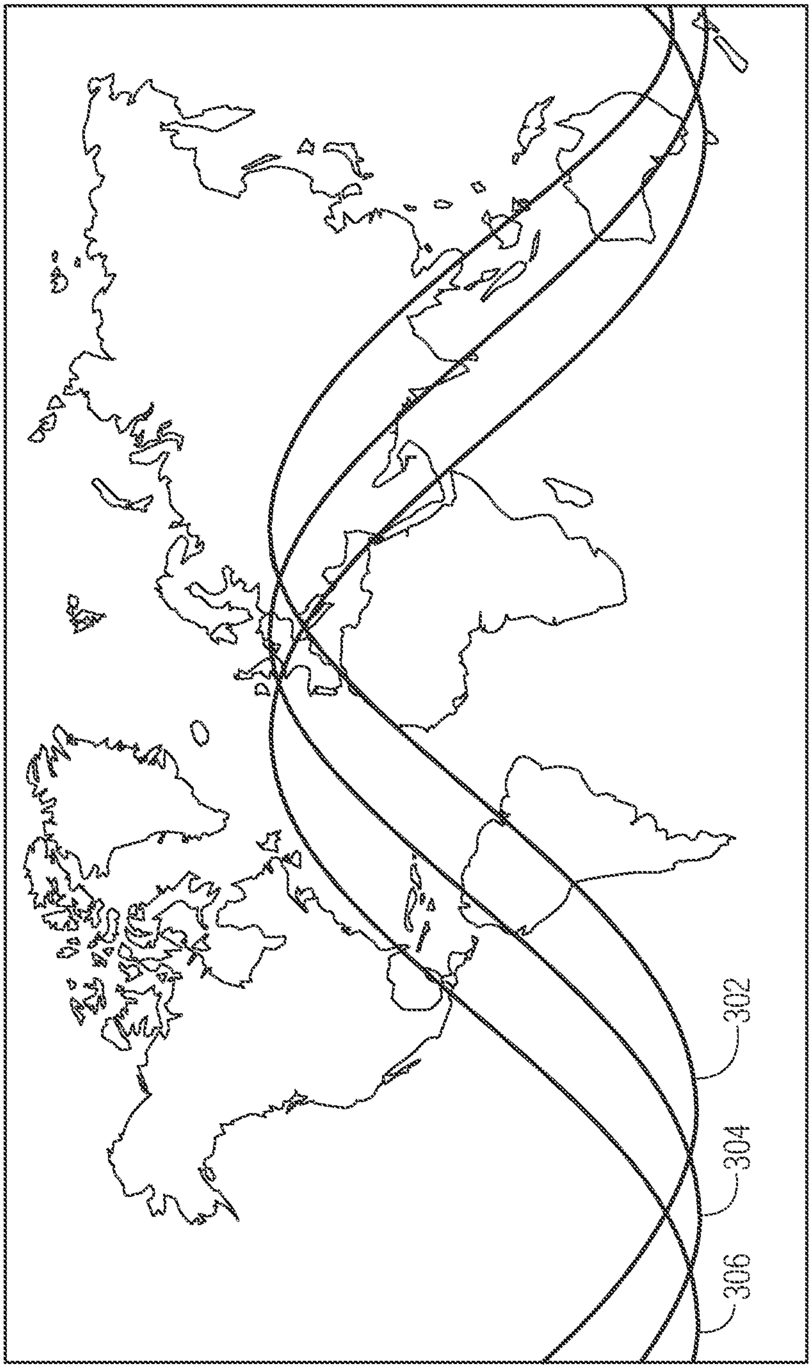
FIG. 3 is a map depicting three different orbital paths for observation satellites.

In general, the position of a large number of satellites over Earth is known and predictable. The satellites orbit in a path that is well defined in both space and time enabling the position and the orbital period of a particular satellite to be calculated accurately using an ellipsoid approximation that accounts for minor orbital perturbations occur due to factors such as geopotential acceleration (arising from the unevenness of the earth's gravity), tide, air drag, solar wind and magnetic induction from the earth and some flight control adjustment due to minor course corrections. Typical earth observation satellites have one controlled main observation angle in terms of the satellite nadir and path direction. The latter is typically zero or close to zero. For many non-military satellites, these orbital paths are made publicly available and allow for the determination of the satellite's current position, as well as the calculation of the satellite's position in the future. In many cases, these published satellite paths allow for the determination of the future position of an observational satellite several days into the future. FIG. 3 is a map depicting three different orbital paths 302, 304, and 306. As depicted in FIG. 3, the orbital paths are formed by two phenomena. The first is the shape of the orbit the satellite travels on around earth. Such orbits are typically in the shape of an ellipse, typically almost circular for earth exploration satellites, where the center of the Earth is located in one of the focal points of the ellipse. The second phenomenon is the rotation of the Earth that, in combination with the orbit of the satellite itself, generates the orbital path, which sets forth the path by which the satellite appears to travel over the Earth's surface.

In all cases, a satellite's orbital path may be repetitive for a reasonable time period toward the future so that orbital path repeats with each orbit so that the satellite will regularly travel along the same path across multiple orbits. Specifically, if the Satellite orbits the Earth every twenty-four hours, precisely, the orbital path of the satellite will repeat every twenty-four hours, which is the case for a geostationary satellite. If a satellite's orbit is such that the satellite orbits Earth every N hours and M minutes, etc., precisely, this enables multiple measurements of the same geographic region to be captured every N hours and M minutes (i.e., the measurements are repeated at a frequency equal to the orbit's period). A typical low earth orbit period for Earth observation satellites, for example, may be about 1 hour and 50 minutes. Higher orbits result in longer orbital periods.

Using these known orbital paths, it is therefore possible to know or precisely predict a satellite's position over Earth at a particular time. With that location information in combination with knowledge of the satellite's sensor parameters (e.g., altitude, observational angle with respect to Earth, and FOV size and shape), it is possible to calculate for any observational satellite at any time, the geographical observation region for that satellite.

Figure 4A:
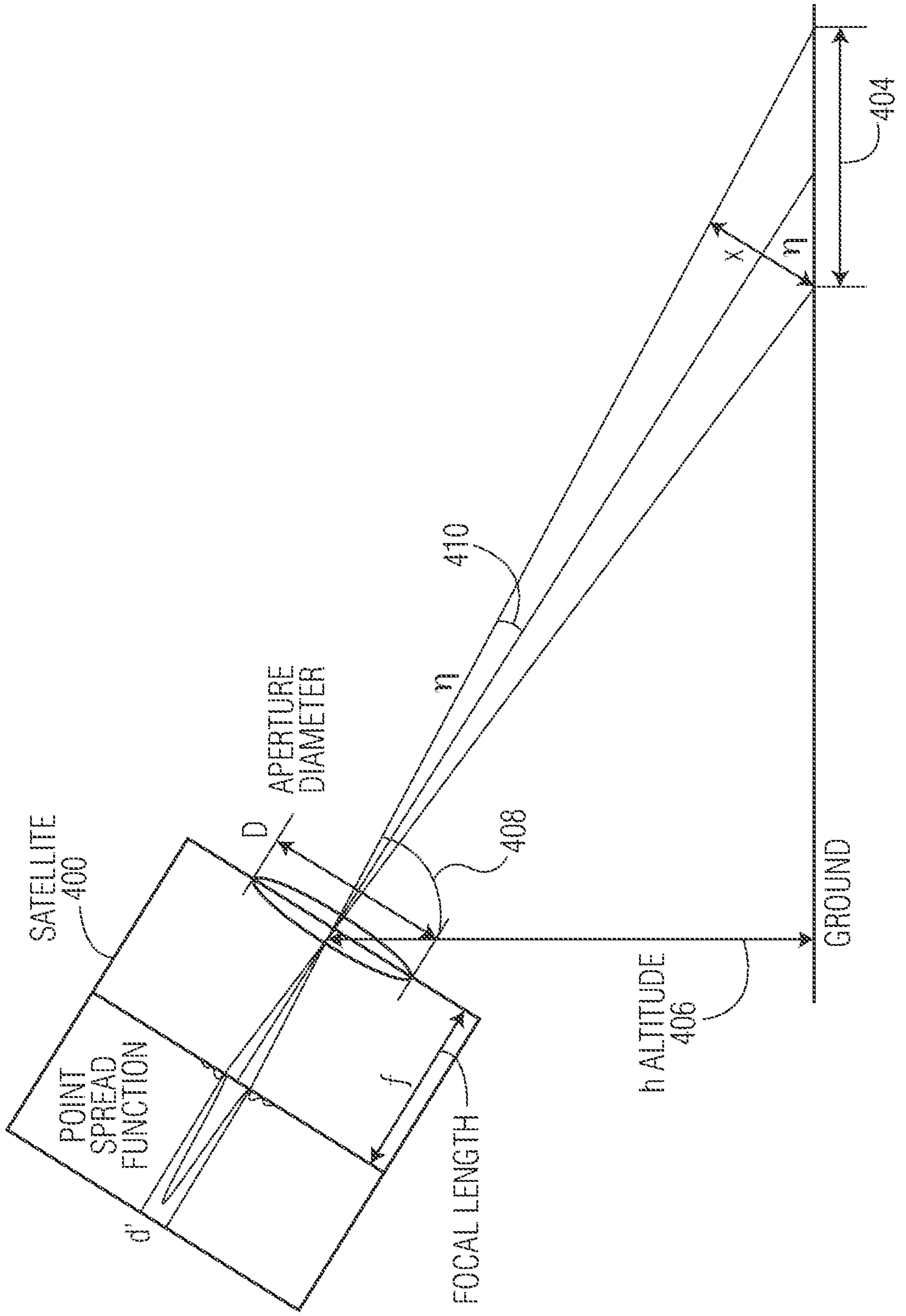
FIG. 4A depicts an approach for calculating the location, size, and shape of a satellite's geographical observation region.

For example, FIG. 4A depicts a geometrical approach for calculating the location, size, and shape of a satellite's geographical observation region, given the position of the satellite. As shown in FIG. 4A, given the position of the satellite 400 it is possible to calculate the size of the geographical observation region 404 with knowledge of the satellite sensor's configuration. Specifically, using the known height of the satellite 406, the angle of observation 408, and the field of vision 410 of the satellite, it is possible to calculate the dimensions of geographical observation region 404.

There are four popular earth scanning approaches used by satellites. The first uses a fixed point, defining one "pixel" on the earth, a pixel being the area observed by the satellite (e.g., the geographic observation region). The second system is called a "conical scan" in which the satellite pixel scans a cone around a main observation axis of the satellite. The third system is a so called "cross-track" in which the satellite's pixel sweeps the path under a main observation angle, typically orthogonal to the satellite path. The fourth system denoted as "push-broom" uses an array of sensors (antenna's) that scan a line of pixels across the path of the satellite over the earth, similar to the third system, but observing all points on the path simultaneously. There may also be other types of scanning methods.

In accordance with the present disclosure, transmitters that are within the geographical observation region of a satellite or a corresponding geographical mitigation region, may be configured to modulate signal transmissions at frequencies that overlap or are adjacent to those being observed by the satellite. To provide a safety margin, in various embodiments, the geographical mitigation region is based upon the geographical observation region and, in some embodiments, may be adjusted (e.g., increased) based upon the particular scanning methodology of a satellite, as described below. By accounting for an adequate safety margin about the satellite's geographical observation region(s) using the geographical mitigation region, the antenna of the satellite will provide sufficient attenuation so as not to significantly receive signals from terrestrial transmitters outside the satellite's mitigation region that are not taking mitigation measures. The size of the safety margin or geographical mitigation region around the satellite's pixel region can be increased to compensate for various inaccuracies in, and impractical aspects of accurately predicting or accounting for details of the path and observation direction of the satellite.

In various embodiments, transmitters may be configured to synchronize the application of the interference mitigation techniques described herein to the location of the momentarily observed geographical observation region (i.e., the satellite's observation pixel) or a mitigation area drawn around the geographical observation region. This may be used, for example, for satellites employing conical and cross-track observation methods and requires that the radar transmitter has accurate knowledge of the momentary orientation of the satellite's scanning subsystem (or is communicating with a system have that knowledge). Other methods that do not depend on such accurate time synchronization may choose to extend the area for mitigation methods to encompass full sweeps of the satellite's geographical observation region around a conical pattern or cross-track path and the associated safety areas. The area in which transmitters should take mitigation measures is called the mitigation area.

Figure 4B:
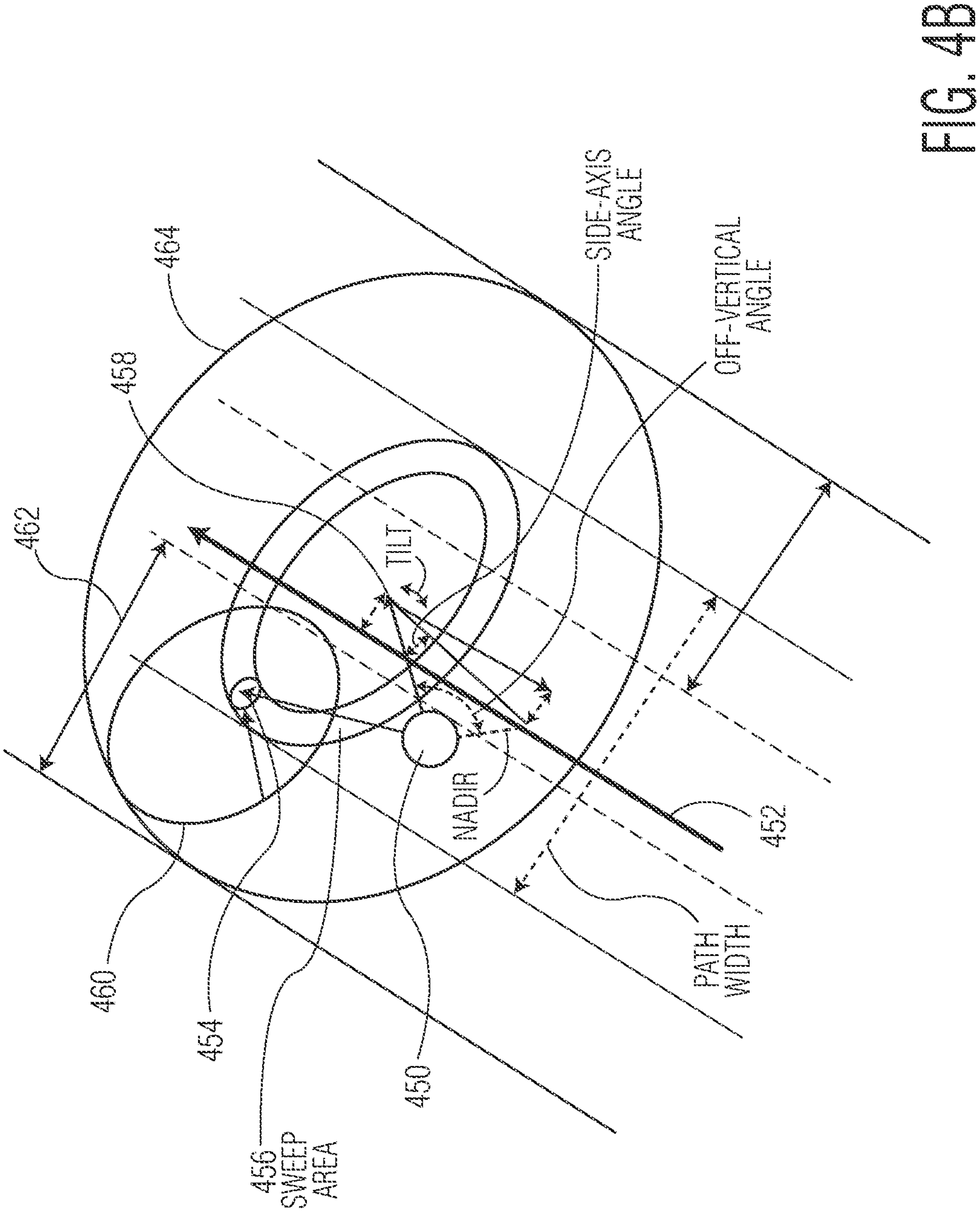
FIG. 4B depicts a path of an observation region of a satellite and corresponding mitigation regions.

To illustrate these two approaches for determining the geographical mitigation region for a particular satellite, FIG. 4B depicts a path of a satellite 450 over the earth. In this example, satellite 450 is traveling in a direction parallel to arrow 452. Based upon the elevation of satellite 450 over earth and other of the satellite's viewing attributes (e.g., satellite 450's FOV, side-axis angle, off-vertical axis, and sensor angle) it is possible to predict the momentary geographical observation region 454 of satellite 450.

In the example depicted in FIG. 4B, satellite 450 is employing a scanning imaging approach in which the momentary geographical observation region 454 moves along a sweep path 456 (also referred to herein as a pixel sweep area or observational sweep area). In various different satellite configurations, a sweep path may have any suitable shape and size and may be static or may change over time.

The sweep path 456 is defined with respect to an offset location 458 of satellite 450 that is determined by the location of satellite 450, the off-vertical angle and the side-axis angle of satellite 450. The offset location 458 and sweep path 456 are defined with reference to the location of satellite 450 so that as the satellite 450 moves over earth, the position of sweep path 456 does not change with respect to the location of satellite 450 unless the satellite's flight path and/or viewing characteristics (e.g., observation angle, altitude) are modified.

If a transmitter is configured to synchronize its mitigation approach to the specific movement and timing of the momentary geographical observation region 454, it may be possible for the geographical mitigation region for satellite 450's operations to be relatively narrowly drawn around the momentary geographical observation region 454 and to track with the movement of geographical observation region 454 as it moves along sweep path 456. For example, with reference to FIG. 4B, in a synchronized transmitter device, the geographical mitigation region for momentary geographical observation region 454 may be defined by mitigation region 460. As shown, the size of mitigation region 460 is greater than the size of momentary geographical observation region 454 and so mitigation region 460 includes some additional margin for error or an additional protection region around momentary geographical observation region 454, as described above. However, mitigation region 460 is not large enough to encompass the entire sweep path 456 being used by satellite 450. The specific size of mitigation area 460 can be large or small depending on the attenuation from transmitters operating in the area outside mitigation area 460 required by the satellite receiver, and offered by the antenna beam pattern of the satellite receiver. A higher attenuation requires a larger area.

In an embodiment, the mitigation region 460 defined around momentary geographical observation region 454 is sized so as to include the entire area of momentary geographical observation region 454 and may cover a side skirt region 462 defined to the sides of the path of satellite 450. The side skirt region 462 may comprise an attenuation region in which signal emissions could be detected by the sensors of satellite 450.

With mitigation region 460 defined, a synchronized transmitter can be configured, in accordance with the present disclosure, to implement interference mitigation when the transmitter determines that it is located within mitigation region 460. This synchronized approach, however, requires very precise path and imaging data synchronization between the satellite 450 and all synchronized transmitters in the area.

Although this may be feasible for transmitters with high processing capabilities and/or low-latency communications such that the transmitters are able to maintain synchronicity with the satellite 450's imaging activities (i.e., the real-time position of momentary geographical observation region 454), other types of transmitters may be unable to operate in such a synchronized fashion.

Accordingly, for transmitters that do not use time synchronization to the satellite's specific observation region location, the geographical mitigation area can be a defined geographical area with an orientation relative to the satellite that is not focused on the particular location of momentary geographical observation region 454. Due to the lack of synchronicity, the transmitter cannot determine at which point along path sweep path 456 momentary geographical observation region 454 is located. Consequently, a different mitigation region 464 may be established for satellite 450 that is much greater in area than mitigation region 460 to provide greater margin for error and ensuring that the transmitter does not interfere with the operations of satellite 450 regardless of at which point along sweep path 456 momentary geographical observation region 454 is positioned.

As illustrated in FIG. 4B, mitigation region 464 is sized to encompass the entire sweep path 456 of satellite 450. Consequently, if the transmitter is configured to implement interference mitigation when the transmitter is located within the larger mitigation region 464, the transmitter can avoid interference without any specific knowledge of where momentary geographical observation region 454 is located along sweep path 456. As such, this approach does not require precise timing synchronization between the imaging activities of satellite 450 and the transmitter.

In some embodiments, if the observation direction of the satellite is known and stable, rather than computing the satellite position first and then computing the geographical mitigation region based upon the satellite's observation pixel, using a possibly time-changing observation direction, the path of the mitigation zone may be computed directly.

For methods that synchronize to the satellite's scanning operations, this means there is a scanned area around the main observation region of the satellite that defines a geographical mitigation region in which radar transmitters present within the mitigation region should apply appropriate mitigation techniques at well synchronized time periods. If the observation direction is known and stable, rather than computing the satellite position first and then computing the mitigation zone using the observation direction, the shape of this area may be calculated once and its path over the earth may be predicted directly. The position of the pixel and actual geographical mitigation area along the pixel path can be calculated using the appropriate time reference.

All of the methods above permit the calculation of the times at which the path of the geographical mitigation area intersects with a radar transmitter on a specific position on the earth's surface. The transmitter can compute knowledge of its location and apply an appropriate mitigation method at time periods when the transmitter is located within an active geographical mitigation area.

There are various methods and corresponding calculation methods that can be used to convey the required information about the mitigation area path to transmitters and allow the transmitters to calculate the times at which they have to take mitigating measures.

One such method may use the location and time of the crossing of a latitude in northern direction and the one in a southern direction, and use the periodic nature of an ellipsoid path and the earth's rotation to predict the next crossing. Interpolation methods using other latitude crossings can be used to predict the crossing in time and location at other latitudes. Minor corrections to this method may be applied to compensate for predictable perturbations of the ellipsoid path.

The geographical mitigation area path and timing information can be provided to the transmitters from one or more data sources. The path information can be updated from time-to-time if, for example, a satellite performs certain path corrective maneuvers for various reasons and alter its course and main observation direction. Also new satellites may start observation and satellites may be decommissioned. Therefore, terrestrial receivers will need to perform regular updates from a data source to have the latest satellite mitigation path information. Satellite mitigation information may also be tagged with a maximum lifetime or an increase of inaccuracy of the path prediction over time, e.g., as a growing safety area. And there may be new information for each satellite, typically non-overlapping periods in the future to cater for planned deviations of or to compensate for predictable perturbations of the mitigation area path. In general, the geographical mitigation area path information describes the time-varying location of the geographical mitigation area as it passes over the surface area. As such, the geographical mitigation area path information, in combination with a transmitter's location information, provides a transmitter with sufficient information to determine whether the transmitter is currently located within a geographical mitigation area for a given observing satellite. Radar transmitters may be configured to periodically update their satellite path (and geographical mitigation region path) data bases to ensure the path information is accurate and continues to be reliable. For example, transmitters may periodically access a known data source (e.g., via the Internet) storing satellite path information to update their local path databases. Alternatively, radar transmitters may communicate with other nearby radar transmitters to acquire information indicating location or path data for geographical mitigation regions and whether active interference mitigation techniques are required or if the radar system can continue normal operations.

Alternatively, the transmitter not having access to up-to-date geographical mitigation area path information may make such decision not on a data source but local criteria, e.g., a certain maximum time the transmitter can operate without mitigation.

Alternatively, a transmitter that does not have access to up-to-date mitigation path information may attempt to synchronize its mitigation activities to those of other transmitters in the vicinity of the transmitter or attempt to otherwise acquire the missing information by communicating to such transmitters requesting this information to be provided as an alternate source of data.

In relatively short distance communication networks that have a centralized control transmitter system and various remote stations using information from the central control transmitter system to determine when and at what frequency to transmit the central control transmitter system may ensure the remote stations only transmit information at a time and frequency that does not cause interference with the satellite receiver using mitigation area approaches similar to those described for automotive based systems.

The position information used for this central decision making can be that of the coverage area of the central control transmitter, thus avoiding the requirement on the remote stations to have independent location information and having to independently decide on how to adjust their transmitter operation. This works well in case the coverage area is relatively modest (e.g., less than a range of 10 km) compared to the geographical mitigation area.

A number of vehicles or other systems, each with a number of operational transmitter systems may be located within a particular geographical mitigation area (e.g., an observation region that is defined by a satellite's observation pixel plus a determined safety region) at any time. For the radar systems incorporated into vehicle, if those vehicles include geolocation capabilities (e.g., via a global navigation satellite system (GNSS) or global positioning systems (GPS)), those vehicles may be configured to determine various vehicle location attributes, as such position, heading and speed. If the vehicles are also aware of the orbital paths of various observational satellites over the general area, the vehicles can determine the locations of the geographical mitigation areas of those satellite and make determinations as to whether the vehicles (and their radar systems) are located within an active geographical mitigation area. If so, then the vehicles' radar systems may take action to mitigate potential interference with the satellite's activities, such as by temporarily disabling the various radar systems or changing the operational parameters of those systems (e.g., by temporarily generating lower power output signals, reducing the duty cycle of the radar systems various transmitters, adjusting beamforming or directional attribute of the signals output by the radar system, and combinations thereof).

This approach can prevent interference and enable optimal performance of the observation satellite, but may result in a small loss of radar data. As described, herein, amount of data lost will be sufficiently small to likely enable acceptable operation of such radar systems with no diminution of the system's safety benefits.

Figure 5:
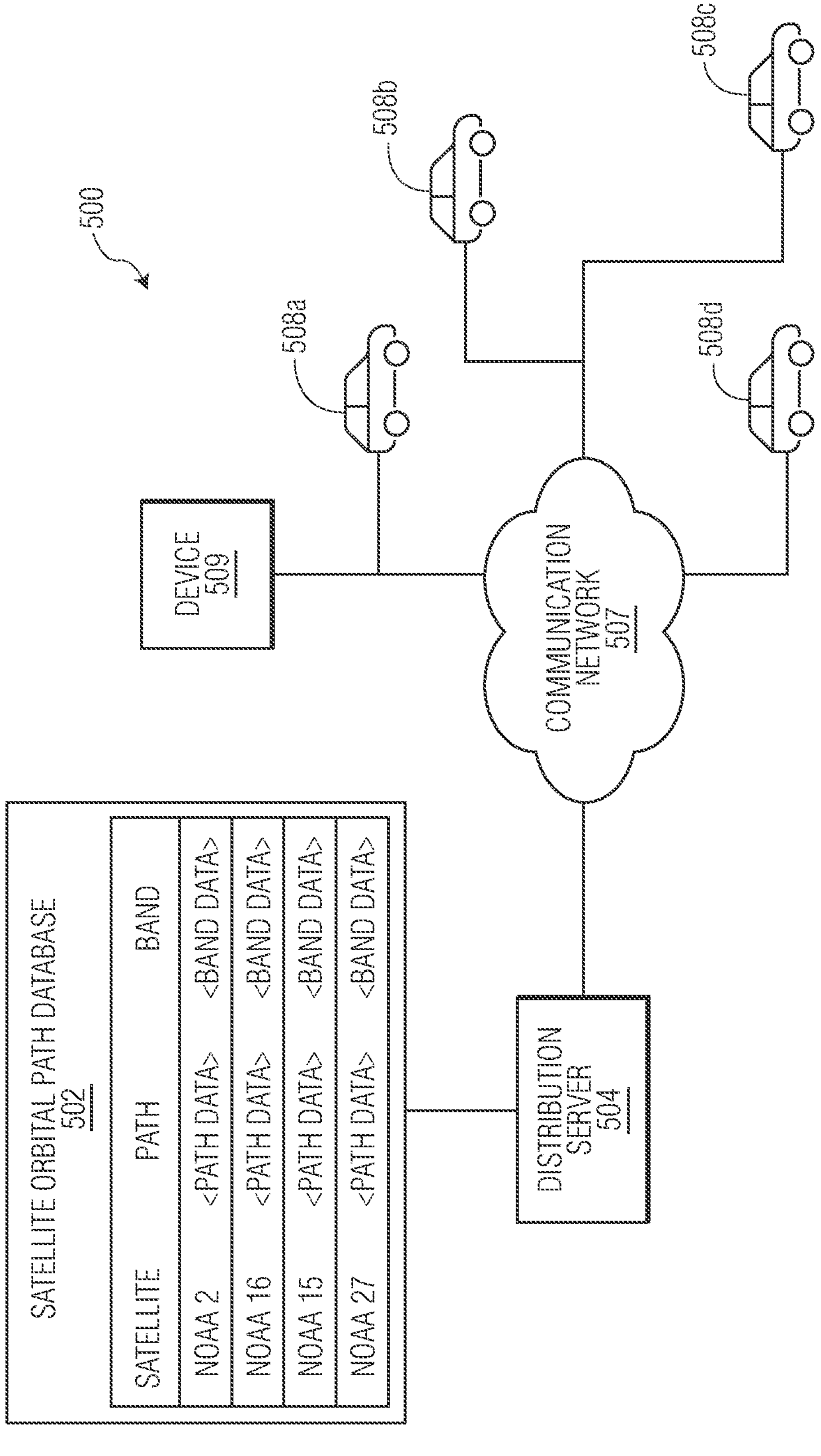
FIG. 5 is a system diagram depicting functional element of a system for mitigating interference caused by vehicle radar systems.

FIG. 5 is a system diagram depicting functional elements of a system for mitigating interference caused by radar systems. System 500 includes a satellite orbital path database 502. Database 502 is configured to store orbital path projections for a number of different Earth observation satellites. For each observational satellite, database 502 stores an identification of the satellite, the satellite's path information (e.g., a series of geolocation coordinates and time codes specifying that the satellite will be at those geolocation coordinates at times corresponding to those time codes), and the frequency bands that are observed by the satellite. In various embodiments, the satellite orbital path information may be encoded as a path projection as described above.

Within database 502, the satellite orbital path information, as well as the frequencies-observed data, may be updated from time-to-time as satellite orbits are adjusted (e.g., due to normal path degradation or active orbit adjustment), or their assigned observations are updated or modified.

The data stored in database 502 may be retrieved from any suitable resources that publishes satellite orbits and other operational information. Database 502 may be created manually, in which can an operator of data input system to database 502 may perform manual research to identify particular satellites and their orbital information. In other embodiments, a data input system to database 502 may operate automatically by acquiring data from various publicly or commercially available satellite data resources or be directly provided by satellite operators and converting that data into the records of database 502.

In various embodiments, database 502 may store additional information describing the activities of the individual satellite's that may be utilized in the calculation of geographical mitigation area paths for the satellite. Such path data may include an identification of the satellites' data scanning methodology, FOV size and shape, viewing angle, and other data that can be used, in conjunction with the satellite's projected location data, to calculate geographical mitigation region path that identifies the size and location of the geographical mitigation region for each satellite at various time intervals for a particular time duration (e.g., several hours or days).

Distribution server 504 is connected to database 502. Distribution server 504 is configured to retrieve the satellite orbital path and frequency monitoring information from distribution server 504 and transmit that data to a number of systems that may house radar transmitters. In the specific example of FIG. 5, distribution server 504 is configured to transmit the orbital path (or mitigation region data, as described below) and frequencies-monitored data (and any other data contained within database 502) to a number of vehicles 508*a*-508*d* via communication network 507 or other devices 509 that may incorporate transmitters configured to emit signals at frequencies that may interfere with satellite observations (e.g., fixed radar systems, such as traffic controls systems or devices that utilize active radar system to monitor and control the flow of vehicle traffic).

Communication network 507 may comprise any suitable communications network that enables distribution server 504 to communicate with each of vehicles 508*a*-508*d* and devices 509. In some embodiments, distribution server 504 may transmit the raw data as stored in database 502 to the various vehicles 508*a*-508*d* and other devices 509. In other embodiments, distribution server 504 may instead be configured to use the data stored in database 502 to calculate geographical mitigation area paths for each of the satellite's stored in database 502 to the vehicles 508*a*-508*d* and devices 509. In that case, the vehicles 508*a*-508*d* and devices 509 are not required to independently calculate the geographical mitigation area paths and instead can receive the pre-calculated paths from distribution server 504.

In some embodiments, distribution server 504 is configured to retrieve all information stored in database 502 and transmit all retrieved data to each vehicle 508 and device 509 so that each vehicle 508 and device 509 stores the same satellite path and observation frequency data. In other embodiments, such as where the data stored by database 502 is voluminous, distribution server 504 may be configured to provide different portions of the retrieved data (or calculated geographical mitigation area paths). For example, for a particular vehicle, distribution server 504 may only transmit the portion of the data from database 502 or mitigation paths that is associated with satellites that will have a geographic observation region that falls within a given distance (e.g., within 1000 km) of the vehicle 508 and device 509's current position.

In other embodiments, distribution server 504 may only transmit data for satellites that are configured to perform observations in frequencies that are utilized by radar systems implemented on a particular vehicle. For example, if a particular vehicle 508 and device 509 has a radar system configured to transmit signals in the 114.25 GHz-122.25 GHz band, database 502 may not transmit data to that vehicle 508 and device 509 associated with satellites that are only configured to perform observations in a different band (e.g., 148.5 GHz-151.5 GHz) or in frequency bands that are adjacent to those being transmitted by vehicles 508 and device 509.

In various embodiments, information can be provided to each of vehicles 508 and device 509 regarding the number of vehicles and devices that include active radar transmitters that are operational in a particular area or the relative density of vehicles and devices within a particular geographical region (e.g., by dividing the number of vehicles and devices in the region by the size of the region). Such information may be obtained from various data sources, such as a network operators database, and/or derived from data captured by various vehicle systems, such as V2X or radar systems. As discussed further below, this radar transmitter density information may be an indicator of a potential level of interference that may be caused by operational transmitters in the area and so may be used to further control how the vehicles 508 and devices 509 in a particular region modulate their radar systems to mitigate potential interference. If, for example, the radar transmitter density in the local area exceeds a particular threshold, that may indicate a high interference potential and all vehicles 508 and devices 509 in that region may control their respective radar systems to minimize or mitigate interference. If, however, the radar transmitter density in the local area falls below a particular threshold, there may be a low interference potential and it may not be necessary for the vehicles 508 and devices 509 in that region to minimize interference as the magnitude of radar signals being generated by the relatively small number of radar transmitters may fall below a noise threshold for any observing satellite. Accordingly, for a particular area a threshold value number of radar systems (below which no mitigation is required and above which mitigation is required) may be determined by multiplying a predetermined vehicle density value by a size of the corresponding geographical mitigation region. In various embodiments, vehicle density estimations could be made using a channel busy ratio (CBR) as indicated by a V2X communication protocol in use to enable data communications between vehicles. A high CBR may be indicative of a large number of vehicles communicating in a particular area and, in turn, a high vehicle density. Conversely, a low CBR may indicate a low local vehicle density.

Figure 6:
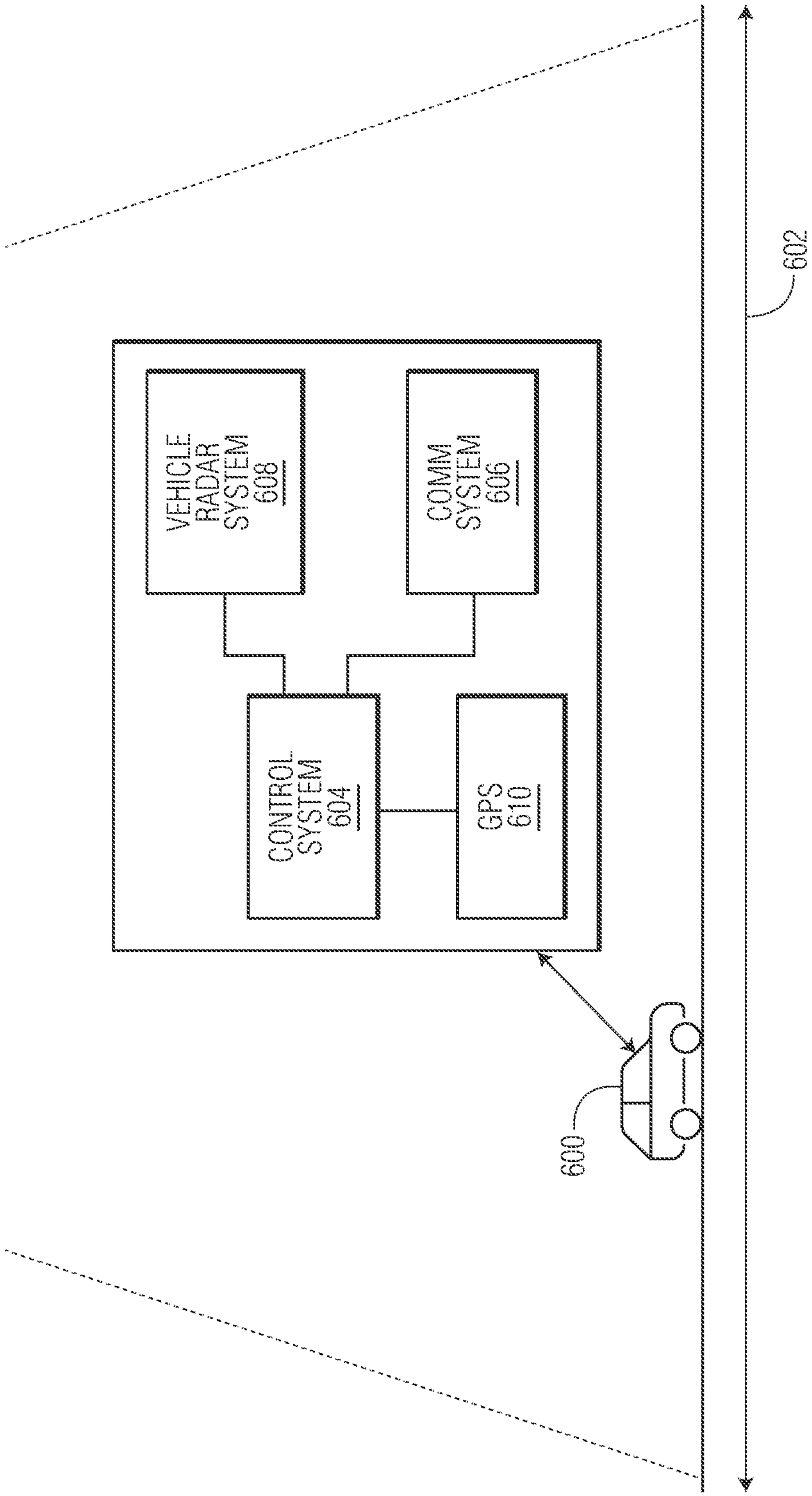
FIG. 6 depicts a vehicle operating within a geographic observation region of a satellite, where the vehicle is configured to operate its vehicle radar system so as to minimize interference with the satellite's operations.

FIG. 6 depicts a transmitter operating within a geographic mitigation region 602 associated with a satellite (not shown), where the transmitter is configured to operate in a manner configured to minimize interference with the satellite's operations. In the specific embodiment of FIG. 6, the transmitter (e.g., a radar transmitter) is incorporated into a vehicle 600 (e.g., vehicles 508*a*-508*d*, FIG. 5), however it should be understood that the transmitter may not be incorporated into a vehicle and may instead be a fixed-location transmitter or other type of mobile transmitter.

In the embodiment in which the transmitter includes a vehicle radar transmitter, vehicle 600 includes a vehicle control system 604. Control system 604 may include any suitable processing system (such as a general purpose or application-specific computer processors) that is configured to receive and process data and transmit control instructions to other systems and subsystems within vehicle 600. Control system 604 may be implemented by a data processing system incorporated within vehicle 600. In other embodiments, aspects of control system 604 may be implemented by a system (e.g., a cloud computing or remote computing service) that is external to the vehicle 600.

Vehicle control system 604 is connected to communication system 606 to enable data to be transmitted and received by control system 604. In embodiments, communication system 606 may comprise a wireless transmitter and receiver configured to transmit and receive data using e.g., IP protocol-based communication over cellular networks (e.g., 4G or 5G network) or V2X communications. In the case of fixed-location radar transmitters, such device may communicate with remote device using IP protocols over fixed access IP network infrastructure for fixed location transmitters. Control system 604 is configured to use communication system 606 to retrieve satellite data (e.g., orbital path data and frequency band of observation data) or geographical mitigation region path data from a remote data storage location (e.g., satellite orbital path database 502).

Control system 604 is connected to radar system 608 (e.g., vehicle radar system 100). Control system 604 is configured to transmit control signals to radar system 608 enabling control system 604 to control or modify the operation of radar system 608. Specifically, control system 604 is configured to cause radar system 608 to prevent the transmission of radar signals during a particular time period specified by control system 604. Alternatively, control system 604 can be configured to cause radar system 608 to reduce a power level of transmitted radar signals during a particular time period, or to otherwise modify the manner in which radar system 608 transmits radar signals (e.g., by reducing the duty cycle of the radar systems various transmitters, adjusting beamforming or directional attribute of the signals output by the radar system, or via other adjustments).

Control system 604 is also in communication with GNSS system 610. GNSS system 610 is configured to determine a geographic location of the GNSS system 610. Control system 604 is configured to retrieve that geographic location from the GNSS system 610 to determine a location of the vehicle 600.

Figure 7:
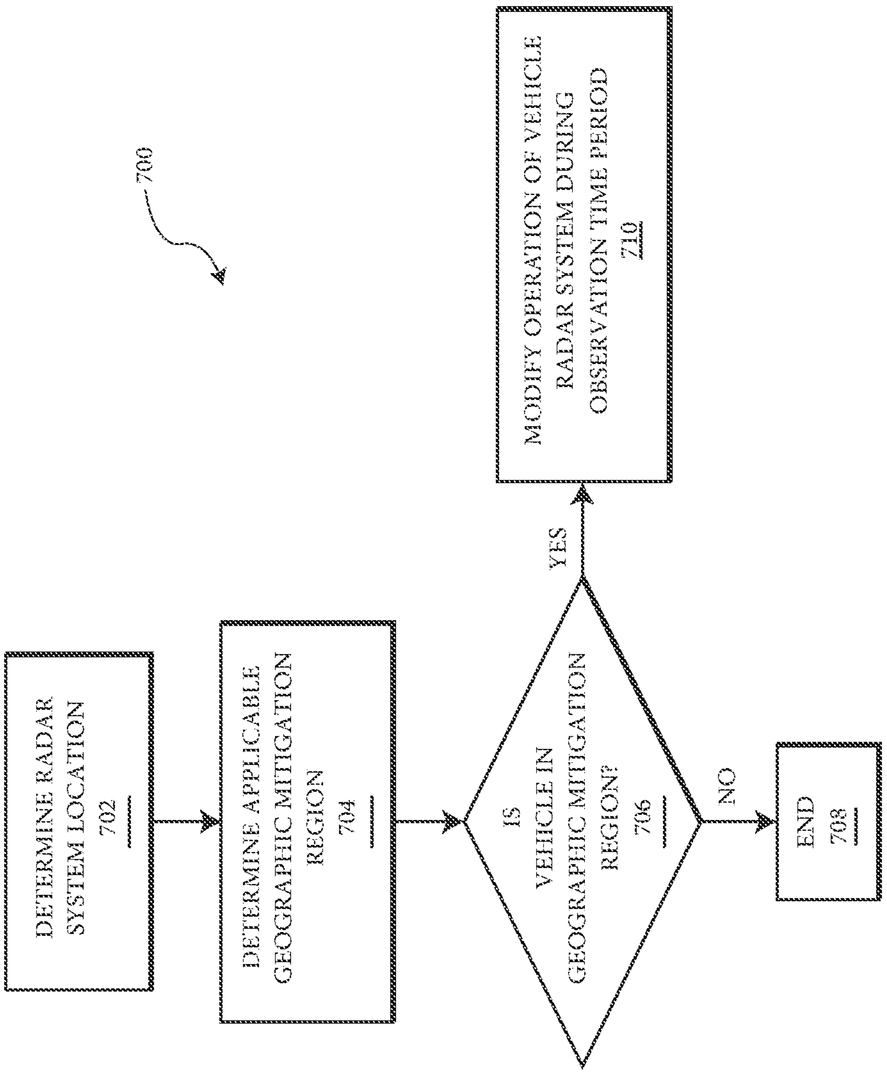
FIG. 7 is a flowchart depicting a method that may be implemented by control system of vehicle to mitigate risk of the vehicle's radar system interfering with satellite observations.

FIG. 7 is a flowchart depicting a method 700 that may be implemented by control system 604 of vehicle 600 to mitigate risk of the vehicle 600's radar system 608 (or another type of signal transmitter) interfering with satellite observations. Method 700 may be executed periodically to determine within the radar system 608 is located within an active geographic mitigation region and, if so, that the radar system should undertake interference mitigation activities. The frequency at which method 700 is executed can depend upon the speed of the movement of the geographical mitigation area over the earth and should be a fraction of the time of the vehicle resides within the mitigation area. Even in situations where the radar system 608 is positioned within a moving vehicle 600, the relative speed of the vehicle 600 is very slow as compared to the movement speed of a geographical mitigation region over the surface of earth. As such, method 700 may not be executed at a very high frequency and may instead be executed every 10 seconds or every few minutes so to confirm that the vehicle 600 is not located within an active geographical mitigation region. Alternatively, control system 604 may calculate the time at which the vehicle 600 enters the geographical mitigation area and the time at which the vehicle 600 exits the mitigation area based on a relatively recent position. This is computationally more efficient since the speed with which the mitigation area moves over the earth is typically much faster than the movement speed of the radar system 608.

In step 702, control system 604 determines a current location of the radar system 608. If radar system 608 is incorporated into a vehicle or other moving object, this step may be performed by control system 604 accessing a connected GNSS system 610 to determine a current location of the radar system 608. Alternatively, if radar system 608 is incorporated into a fixed-location device, the location information may be determined by accessing stored location data for that fixed-location equipment.

In step 704, control system 604 accesses satellite orbital path data (e.g., originally retrieved from satellite orbital path database 502) or geographical mitigation region path data received from distribution server 504 to determine whether the vehicle 600 is currently located within an active geographical mitigation region.

In embodiments, where control system 604 has access to satellite path data received from distribution server 504 this may involve control system 604 analyzing the satellite orbital path data (and other data, such as the satellite's data scanning methodology, FOV size and shape, and viewing angle) received from distribution server 504 to calculate a geographical mitigation region path for the satellites that are configured to monitor frequency bands that overlap with or are adjacent to those utilized by one or more of the radar systems 608 of vehicle 600 In other embodiment, control system 604 may instead receive directly from distribution server 504 those geographical mitigation region paths.

In some alternative embodiments of the present system, rather than require each individual transmitter device (e.g., radar system 608 in combination with control system 604) to determine, based on a satellite path, whether the vehicle or other device falls within a satellite's geographical mitigation region, the system may instead by implemented by a number of different broadcast beacons (e.g., a cellular base station) that may be configured to broadcast, over a local geographic area, observation time windows during which satellites will be observing that particular geographic region (i.e., the area in which the broadcast beacon is located). These broadcasts can, in turn, enable radar systems 608 that are within communication range of the beacons to receive the observation windows and modulate their own radar transmitters accordingly.

For example, distribution server 504 may be configured to, instead of transmitting satellite path data or mitigation region data, transmitting to vehicles 508 or devices 509 in a particular location (e.g., a location associated with a geographic mitigation region) an indication of a time period during which the vehicle 508 or device 509 should perform interference mitigation. Alternatively, the distribution server 504 may inform vehicles 508 and devices 509 in a particular area of times during which signal transmissions are authorized. In that case, vehicles 508 and devices 509 may be configured to inhibit all signal transmissions until they have received a message from distribution server 504 indicated that they are authorized to begin transmissions.

In step 706, having determined one or more geographical mitigation region paths, control system 604 determines, using the location data determined in step 702, whether the radar system 608 is currently located within an active geographic mitigation region. If not, the method moves to step 708 and ends. If, however, the radar system 608 is located within an active geographic mitigation region, the method proceeds to step 710 and the control system 604 modifies the operation of the vehicle radar system to reduce potential interference with the satellite's activities. As discussed herein, the control system 604 may be configured to modify the operation of the radar system 608 to minimize interference by instructing the radar system 608 to not transmit radar signals during the observation time period or reduce a power level of any transmitted signals during the observation time period.

To minimize errors that may result from anomalies or artifacts present in single frame data due to various radar limitations (e.g., ghost targets due to multipath propagation), tracking filters are typically designed to deal with unreliable data by processing the radar data to construct predictive tracks of objects only if there are several detections of the same objects in consecutive frames. In the case of a small number of intentionally lost frames to avoid satellite interference, therefore, captured radar detail will be provided to such a tracking filter that can be designed to take into account that there is a missing frame or frames in the sensing data pipeline.

Due to the robustness of tracking filters that can be implemented within vehicle radar systems 608, such systems may be sufficiently robust, even if several sequential radar frames are missing. Accordingly, the control system 604 may be configured to implement a guard interval around the observation time period so that the operation of vehicle radar system 608 is modified slightly before (e.g., 10 ms before) and is not returned to normal until slightly after (e.g., 10 ms after) the observation time period.

In some embodiments, rather than disable the radar system 608 entirely, the control system 604 may be configured to instead cause the radar system 608 to transmit radar signals with a reduced transmit power. In that case, amount of radiation generated by the radar system 608 may be sufficiently reduced to mitigate potential interference with an observing satellite. The exact transmit power of this reduced-power operation may be determined from regulatory specifications, max interference thresholds, position and headings of the vehicle, radar beam patterns, and the like.

During operation of typical vehicle radar systems, the radar systems do not continuously transmit radar signals. Instead, a radar system will periodically transmit signals according to a set duty cycle of the radar system. If the duty cycle of the radar system is set to 50%, for example, the radar system will transmit during a first half (i.e., the "on period") of the radar system's operation cycle and will not transmit (i.e., the "off period) during a second half of the radar system's operation cycle. Similarly, a radar system that operates with a 25% duty cycle will have an on period of the first ¼ of the system's operation cycle and an off period of the last ¾ of the system's operation cycle.

Because the typical vehicle radar system does not transmit signals 100% of the time, it may be possible for control system 604 to mitigate interference cause by radar system 608 by aligning the "off period" of the radar system 608 duty cycle with the observation time period for geographic mitigation region 602.

Figure 8:
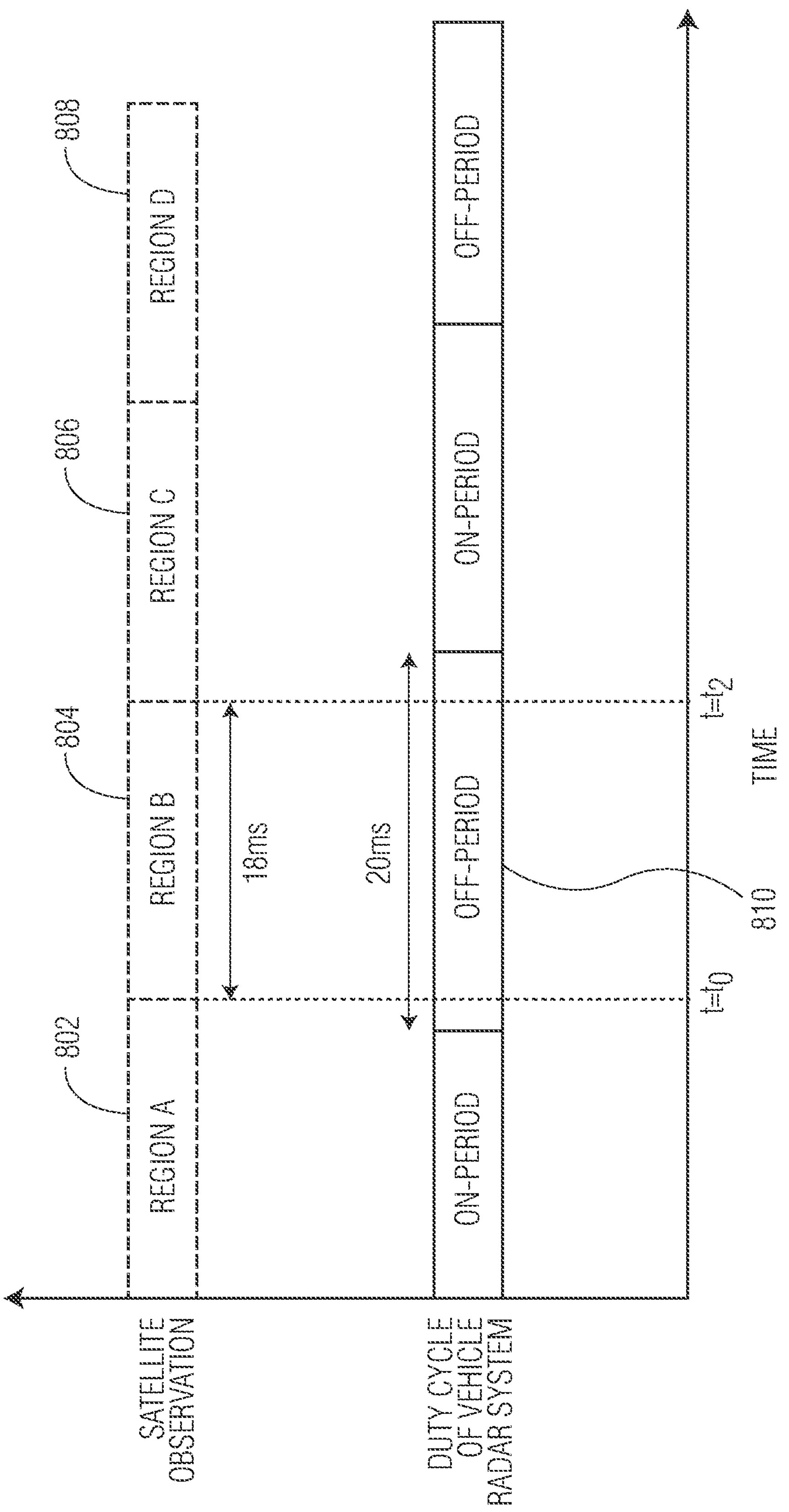
FIG. 8 is a timing diagram depicting a satellite's observation time periods of a sequence of geographic observation regions (i.e., pixels) aligned with the duty cycle of a vehicle radar system.

To illustrate this approach, FIG. 8 is a timing diagram depicting a satellite's observation time periods of a sequence of geographic mitigation regions aligned with the duty cycle of a vehicle radar system. As shown, the satellite is configured to observe mitigation region A for the time period 802, mitigation region B for the time period 804, mitigation region C for the time period 806, and mitigation region D for the time period 808.

In this example, the vehicle determines that it is located in mitigation region B and that the satellite will begin observing mitigation region B at time $t=t_0$ and end observing mitigation region B at time t=ti for a total duration of 18 ms. To minimize interference with the satellite's observations associated with mitigation region B (e.g., in accordance with step 710 of method 700), therefore, the control system 604 can adjust the timing of the operational cycle of radar system 608 so that the off period 810 of the system's operation cycle coincides with time period 804. In typical systems, the off period 810 has a greater duration than time period 804, which provides some error buffer so that even if the timing of radar system 608 and the satellite are not perfectly aligned, radar system 608 will continue to be in its off period and will not transmit any radar signals for the entire duration of time period 804.

In these various approaches, it is likely that vehicles present within a particular geographical mitigation region will be moving. Using knowledge of a vehicle's speed and heading (e.g., due to data received from the vehicle's GNSS subsystem), the vehicle can predict whether the vehicle will travel into or out of the geographical mitigation region as the region is being observed by a passing satellite.

Embodiments of the present disclosure may include features recited in the following numbered clauses:

1. A system, comprising: a server computer, including: a database storing satellite path data for a plurality of satellites, and a processor configured to: retrieve a first satellite path data for a first satellite from the database, calculate, using the first satellite path data, a geographical mitigation region path, the geographical mitigation region path defining a plurality of geographic mitigation regions and observation time periods during which at least a portion of each geographical mitigation region of the plurality of geographic mitigation regions will be observed by the first satellite; and transmit, using a wireless communication network, the geographical mitigation region path to a plurality of vehicles that are within a geographical region; and a vehicle, including: a global navigation satellite subsystem, a vehicle radar subsystem, and a control system configured to: receive, using the wireless communication network, the geographical mitigation region path; determine a location of the vehicle using the global navigation satellite subsystem, determine that the location of the vehicle is within a geographical mitigation region of the plurality of geographic mitigation regions, and modify an operation of the vehicle radar subsystem to mitigate interference with an observation activity of the first satellite.
2. The system of clause 1, wherein the control system is further configured to: determine that a current time falls within the observation time period associated with the geographical mitigation region; and modify the operation of the vehicle radar subsystem by preventing the vehicle radar subsystem from outputting a radar signal during the observation time period.
3. The system of clause 1, wherein the control system is configured to modify the operation of the vehicle radar subsystem to mitigate interference by at least one of: reducing a transmit power, reducing a duty cycle of transmission, and modifying an antenna beam pattern of the vehicle radar subsystem.
4. The system of clause 1, wherein the control system is further configured to: receive, from the server computer, an indication of a first frequency band of signals that are detected by the first satellite; and determine that the first frequency band overlaps or is adjacent to a second frequency band, wherein the vehicle radar subsystem is configured to transmit signals having frequencies that fall within the second frequency band.

5. The system of clause 4, wherein the first satellite is an Earth Exploration Satellite Services (EESS) satellite.

6. The system of clause 1, wherein the control system is configured to: receive, using the wireless communication network, an indication of a number of vehicles operating within the geographical mitigation region; and before modifying the operation of the vehicle radar subsystem, determine that the number of vehicles exceeds a threshold value.

7. The system of clause 6, wherein the control system is configured to determine the threshold value by at least multiplying a predetermined vehicle density value by a size of the geographical mitigation region.

8. The system of clause 1, wherein the control system is configured to: receive, using the wireless communication network, an indication of a vehicle density within the geographical mitigation region; determine an interference potential based upon the vehicle density; and modify the operation of the vehicle radar system based upon the interference potential.

9. The system of clause 1, wherein the first satellite path data includes satellite altitude data, satellite observational angle, and satellite field of vision data.

10. The system of clause 9, wherein the first satellite path data identifies a data scanning methodology and associated parameters used by the first satellite.

11. The system of clause 10, wherein the scanning methodology specifies a pixel sweep area and an area of the geographical mitigation region is greater than pixel sweep area.

12. The system of clause 10, wherein the first satellite system path data includes at least one of: time synchronization information, the data scanning methodology specifying a pixel sweep area, and an area of the geographical mitigation region being less than the pixel sweep area.

13. A system, comprising: a transmitter configured to emit a signal; and a control system, configured to: determine a geographical mitigation region of a satellite, determine the transmitter is located within the geographical mitigation region, and modify an operation of the transmitter to mitigate interference with an observation sensing activity of the satellite.

14. The system of clause 13, wherein the control system is configured to determine a time period during which transmitters located within the geographical mitigation region should mitigate interference with the observation activity and the control system is configured to transmit an indication of the time period to a second device that includes a second transmitter.

15. The system of clause 13, wherein the control system is configured to modify the operation of the transmitter by causing the transmitter to at least one of: reduce a transmit power, reduce a duty cycle of a signal transmission, inhibit transmission of signals having a frequency that overlaps a second frequency band of signals that are detected by the satellite, and modify a transmission beam of the transmitter.

16. The system of clause 13, wherein the control system is further configured to: determine an observation time period during which the satellite will observe at least a portion of the geographical mitigation region; and modify the operation of the transmitter by preventing the transmitter from outputting the signal during the observation time period.

17. The system of clause 13, wherein the control system is configured to: receive a satellite path data for the satellite, wherein the satellite path data includes at least one of: satellite altitude data, satellite observational direction, satellite field of vision data, and a data scanning methodology and associated parameters used by the satellite; and determine the geographical mitigation region using the satellite path data.

18. The system of clause 17, wherein the scanning methodology specifies a pixel sweep area and an area of the geographical mitigation region is greater than the pixel sweep area.

19. A method, comprising: receiving, using a wireless communication network, satellite path data, the satellite path data defining at least one of: an altitude, an observational direction, a field of vision, and a data scanning methodology for a satellite; determining a location of a transmitter;

determining a geographical mitigation region using the satellite path data; determining that the location of the transmitter is within the geographical mitigation region; and modifying an operation of the transmitter to mitigate interference with an activity of satellite.

20. The method of clause 19, further comprising: determining a first frequency band of signals that are detected by the satellite; and determining that the first frequency band overlaps a second frequency band, wherein the transmitter is configured to transmit signals having frequencies that fall within the second frequency band.

The present disclosure describes several embodiments of the present system and method for mitigating potential interference cause by the signals emitted by vehicle radar systems. It should be understood that although several embodiments are focused on modulating the output of vehicle radar systems to mitigate interference caused thereby, the teachings of this disclosure may be applied to systems and methods for mitigating interference caused by other types of devices that emit electromagnetic radiation that could interference with other systems, such devices operating in the telecommunication industry. Similarly, although the present disclosure describes various embodiments in which approaches are used to mitigate interference with satellite observation activities in various frequency bands, it should be understood that the system and method of the present disclosure may be employed to mitigate interference with other systems that may measurement or observe electromagnetic signals in different geographic regions and at frequencies that may overlap with those used by vehicle radar systems.

Various systems and methods described herein may be implemented in computer code running on a processor or controller system and may include code portions for performing steps of various method according to the disclosure when run on a programmable apparatus, such as a controller or enabling a controller to perform functions of a device or system according to the disclosure. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

In the foregoing specification, the invention has been described with reference to specific examples of embodiments of the invention. It will, however, be evident that various modifications and changes may be made therein without departing from the scope of the invention as set forth in the appended claims. For example, the connections may be any type of connection suitable to transfer signals from or to the respective nodes, units, or devices, for example via intermediate devices.

Accordingly, unless implied or stated otherwise the connections may for example be direct connections or indirect connections. However, other modifications, variations and alternatives are also possible. The specifications and drawings are, accordingly, to be regarded in an illustrative rather than in a restrictive sense.

Although the examples have been described with reference to vehicle radar systems, the systems and methods described herein may be implemented in conjunction with other types of systems that may deploy multiple stationary or mobile signals transmitters in various geographical locations. Devices or components described as being separate may be integrated in a single physical device. Also, the units and circuits may be suitably combined in one or more semiconductor devices. That is, the devices described herein may be implemented as a single integrated circuit, or as multiple integrated circuit The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The invention claimed is:

1. A system, comprising:
- a server computer, including:
  - a database storing satellite path data for a plurality of satellites, and
  - a processor configured to:
    - retrieve a first satellite path data for a first satellite from the database;
    - calculate, using the first satellite path data, a geographical mitigation region path, the geographical mitigation region path defining a plurality of geographic mitigation regions and observation time periods during which at least a portion of each geographical mitigation region of the plurality of geographic mitigation regions will be observed by the first satellite; and
    - transmit, using a wireless communication network, the geographical mitigation region path to a plurality of vehicles that are within a geographical region; and
  - a vehicle, including:
    - a global navigation satellite subsystem,
    - a vehicle radar subsystem configured to transmit radar signals according to a predetermined duty cycle that defines an off period in which the vehicle radar subsystem does not transmit the radar signals and an on period in which the vehicle radar subsystem does transmit the radar signals, and
    - a control system configured to:
      - receive, using the wireless communication network, the geographical mitigation region path;
      - determine a location of the vehicle using the global navigation satellite subsystem;
      - determine that the location of the vehicle is within a geographical mitigation region of the plurality of geographic mitigation regions;
      - determine an observation time period associated with the geographical mitigation region; and
      - modify a duty cycle of the vehicle radar subsystem to align the off period of the duty cycle with the observation time period so that the observation time period occurs during the off period to mitigate interference with an observation activity of the first satellite.

2. The system of claim 1, wherein the control system is further configured to:
- receive, from the server computer, an indication of a first frequency band of signals that are detected by the first satellite; and
- determine that the first frequency band overlaps or is adjacent to a second frequency band, wherein the vehicle radar subsystem is configured to transmit signals having frequencies that fall within the second frequency band.

3. The system of claim 2, wherein the first satellite is an Earth Exploration Satellite Services (EESS) satellite.

4. The system of claim 1, wherein the control system is configured to:

receive, using the wireless communication network, an indication of a number of vehicles operating within the geographical mitigation region; and determine that the number of vehicles exceeds a threshold value.

5. The system of claim 4, wherein the control system is configured to determine the threshold value by at least multiplying a predetermined vehicle density value by a size of the geographical mitigation region.

6. The system of claim 1, wherein the control system is configured to:

receive, using the wireless communication network, an indication of a vehicle density within the geographical mitigation region;

determine an interference potential based upon the vehicle density; and modify an operation of the vehicle radar subsystem based upon the interference potential.

7. The system of claim 1, wherein the first satellite path data includes satellite altitude data, satellite observational angle, and satellite field of vision data.

8. The system of claim 7, wherein the first satellite path data identifies a scanning methodology and associated parameters used by the first satellite.

9. The system of claim 8, wherein the scanning methodology specifies a pixel sweep area and an area of the geographical mitigation region is greater than the pixel sweep area.

10. The system of claim 8, wherein the first satellite path data includes at least one of: time synchronization information, the scanning methodology specifying a pixel sweep area, and an area of the geographical mitigation region being less than the pixel sweep area.

11. A method, comprising:

receiving, using a wireless communication network, satellite path data, the satellite path data defining at least one of: an altitude, an observational direction, a field of vision, and a scanning methodology for a satellite;

determining a location of a transmitter;

determining a geographical mitigation region using the satellite path data;

determining that the location of the transmitter is within the geographical mitigation region;

determining an observation time period associated with the geographical mitigation region; and modifying a duty cycle of the transmitter to align an off period of the duty cycle with the observation time period to mitigate interference with an activity of a satellite.

12. The method of claim 11, further comprising:

determining a first frequency band of signals that are detected by the satellite; and determining that the first frequency band overlaps a second frequency band, wherein the transmitter is configured to transmit signals having frequencies that fall within the second frequency band.

* * * * *